(No Model.)
B. F. McINDOO.
SHOVEL.
No. 584,827.  Patented June 22, 1897.
Fig. II.
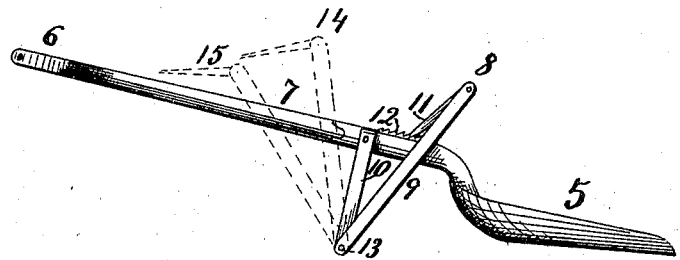
Fig. I.
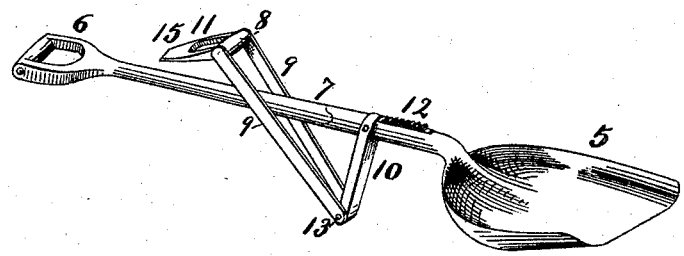
WITNESSES,
N. Stevens.
Finis D. Morris
INVENTOR.
Benjamin F. McIndoo.
by W. X. Stevens. ATTY.
THE NORRIS PETERS CO., PHOTO-LITHO., WASHINGTON, D. C.

UNITED STATES PATENT OFFICE.

BENJAMIN F. McINDOO, OF PUEBLO, COLORADO.

SHOVEL.

SPECIFICATION forming part of Letters Patent No. 584,827, dated June 22, 1897.

Application filed December 24, 1896. Serial No. 616,886. (No model.)

*To all whom it may concern:*

Be it known that I, BENJAMIN F. McINDOO, a citizen of the United States, residing at Pueblo, in the county of Pueblo and State of Colorado, have invented a new and useful Improvement in Shovels; and I do hereby declare the following to be a full, clear, and exact description of the same, reference being had to the accompanying drawings, in which—

Figure I is a perspective view of a shovel according to my invention in position to fill. Fig. II represents the same shovel in side elevation ready to be lifted after filling, the dotted lines indicating the movement of parts in the process of pitching out the contents of the shovel.

This invention relates in general to that class of shovels which are used by hand, and more particularly to scoop-shovels which are used for shoveling grain and other material which requires to be first lifted and then pitched to some distance; and the object of the invention is to so construct a shovel as to render the labor of lifting and pitching any material or substance with it easier and less fatiguing.

To this end my invention consists in the construction and combination of parts forming a shovel hereinafter more fully described, and particularly pointed out in the claims.

Referring to the drawings, 5 represents the blade or scoop portion of the shovel, which may be of any desired form or material, and 6 represents the handle. To the bar 7 of the handle and near the scoop I attach an auxiliary handle 8 by means of a link 9 and a hanger 10. The hanger is rigidly fixed to the bar 7 to depend therefrom, and the link 9 is connected at one end with the lower end of the hanger and at the other end with the handle. These connections may be pivots or any other mechanism which will permit the link 9 to swing freely to and fro lengthwise of the handle-bar 7 and permit the auxiliary handle 8 to revolve relatively to the link. The link is bifurcated to straddle the handle-bar, yet a single link at one side would accomplish the purpose, but not as well. The handle 8 is provided with a brace or pawl 11, shaped at its free end to engage a rack of teeth 12 on the handle-bar 7, by means of which the auxiliary handle is held in its forward position, as shown in Fig. II.

In operation the shovel is taken by the two handles 6 and 8 and when pushed forward into the grain or other material to be shoveled the handle 6 swings back to the position shown in Fig. I; but before making any effort to lift the shovel and contents the operator swings the handle 8 forward to the position shown in Fig. II in the same manner that it is common to slide the hand forward on the handle-bar of the common shovel to lift near the load. Now by a slight rock of the hand holding the handle 8 that handle may be revolved enough to throw the pawl 11 into engagement with the rack 12, whereby the handle 8 is prevented from being swung back to a vertical line over the pivotal point 13, as it would naturally do if not so held, and the load is lifted to the best advantage. Then as the shovel is swung forward to pitch out its load the handle 8 is to be turned a little forward, when the pawl 11 will be disengaged from the rack 12 and the handle 8 will swing naturally backward, as shown in dotted lines 14, and finally arrive at the position 15, when the load leaves the scoop, giving the latter the freest possible pitch and locating the handle 8 in the natural position to push the shovel for the next filling.

By the word "scoop" used in the claims I mean any kind of a shovel-blade, and as some shovels are not provided with the cross-handle 6 I use the word "handle-bar" to indicate the bar 7 with or without a cross-handle 6.

Some advantage would be derived from the link 9 connecting the intermediate handle 8 with the shovel when the link is pivoted at a distance below the handle-bar, even though the pawl 11 were not used. This device may be attached to shovels already made, or it may be made as a part of shovels regularly furnished on the market.

Having thus fully described my invention, what I believe to be new, and desire to secure by Letters Patent, is the following:

1. In a shovel, a handle-bar and blade; a hanger rigidly fixed to depend below the handle-bar near the blade; a link freely connected with the hanger at a distance below and extending above the handle-bar, and a handle upon the link above the handle-bar, substantially as described.

2. In a shovel, a handle-bar and blade; a hanger rigidly fixed to depend below the handle-bar; a link freely connected with the said hanger at a distance below and extending above the handle-bar; a handle freely connected with the link and provided with a pawl, and the handle-bar having one or more teeth upon it to be engaged by the said pawl, substantially as described.

3. In a shovel, a handle-bar having teeth upon it; an auxiliary handle and a link connecting it with a fixture of the handle-bar, and a pawl upon the auxiliary handle adapted to engage the said teeth, substantially as described.

In testimony whereof I affix my signature in presence of two witnesses.

BENJAMIN F. McINDOO.

Witnesses:
 FRANK LOGUE,
 HOSEA B. KING.